United States Patent
Kramadhati et al.

(10) Patent No.: US 11,254,610 B2
(45) Date of Patent: Feb. 22, 2022

(54) COMPOSITION AND METHOD FOR SIMULTANEOUS WATER SOFTENING AND SILICA REMOVAL IN BOILER FEED WATER

(71) Applicant: Lhoist North America, Inc., Fort Worth, TX (US)

(72) Inventors: Narahari N. Kramadhati, La Habra, CA (US); Lacey N. Kucerak, Irving, TX (US)

(73) Assignee: Lhoist North America, Inc., Fort Worth, TX (US)

( * ) Notice: Subject to any disclaimer, the term of this patent is extended or adjusted under 35 U.S.C. 154(b) by 194 days.

(21) Appl. No.: 15/996,907

(22) Filed: Jun. 4, 2018

(65) Prior Publication Data

US 2019/0367411 A1 Dec. 5, 2019

(51) Int. Cl.
| | |
|---|---|
| *C02F 5/06* | (2006.01) |
| *C04B 2/06* | (2006.01) |
| *C02F 1/52* | (2006.01) |
| *C02F 101/10* | (2006.01) |
| *C02F 103/34* | (2006.01) |

(52) U.S. Cl.
CPC .............. *C04B 2/06* (2013.01); *C02F 1/5236* (2013.01); *C02F 2101/10* (2013.01); *C02F 2103/34* (2013.01); *C02F 2303/22* (2013.01)

(58) Field of Classification Search
CPC ........ B01D 20/041; C02F 1/5236; C02F 1/60; C02F 2101/10; C02F 2103/34; C02F 2303/22; C02F 5/025; C02F 5/06; C04B 2/06

See application file for complete search history.

(56) References Cited

U.S. PATENT DOCUMENTS

| | | |
|---|---|---|
| 1,860,781 A | 5/1932 | Liebknecht |
| 2,504,695 A | 4/1950 | Jukkola et al. |
| 3,423,311 A | 1/1969 | Hetherington et al. |
| 4,235,715 A | 11/1980 | Wiegert |
| 4,276,180 A | 6/1981 | Matson |
| 4,332,031 A | 5/1982 | Barkatt et al. |

(Continued)

FOREIGN PATENT DOCUMENTS

| | | |
|---|---|---|
| WO | 98/51614 A1 | 11/1998 |
| WO | WO9851614 | * 11/1998 |

OTHER PUBLICATIONS

Neutralac®; "Neutralac® SLS45. Refresh Your Thinking"; Lhoist website brochure; 8 pages; www.lhoist.com.
PCT/IB2019/054632, International Search Report, 3 pages.

*Primary Examiner* — Pranav N Patel
(74) *Attorney, Agent, or Firm* — Charles D. Gunter, Jr.

(57) ABSTRACT

A slurry product is shown for treating water to both soften the water and to remove silica. The slurry is prepared by blending, in an aqueous medium, hydrated lime under the form of a slurry or of a powder with at least partly hydrated dolime, or magnesium hydroxide or magnesium oxide particles or a combination thereof under the form of a slurry or of a powder, to form an aqueous slurry where the amounts of the dolime, magnesium hydroxide or magnesium oxide particles or the combination thereof are provided such that the solid content of the slurry is up to 60% by weight of the slurry. The slurry also maintains a stable and pumpable viscosity for over a month.

7 Claims, 2 Drawing Sheets

(56) References Cited

U.S. PATENT DOCUMENTS

| | | |
|---|---|---|
| 5,985,152 A | 11/1999 | Otaka et al. |
| 8,206,680 B2 | 6/2012 | Diaz Chavez et al. |
| 8,277,662 B2 | 10/2012 | Nakajima |
| 2008/0011201 A1* | 1/2008 | Strachan ............. C04B 40/0039 106/795 |
| 2015/0146499 A1* | 5/2015 | Crabb .................... F04B 17/05 366/191 |
| 2015/0184078 A1* | 7/2015 | Lorgouilloux ......... C09K 21/02 428/402 |
| 2017/0152175 A1* | 6/2017 | Kutlubay ............ C04B 40/0046 |

\* cited by examiner

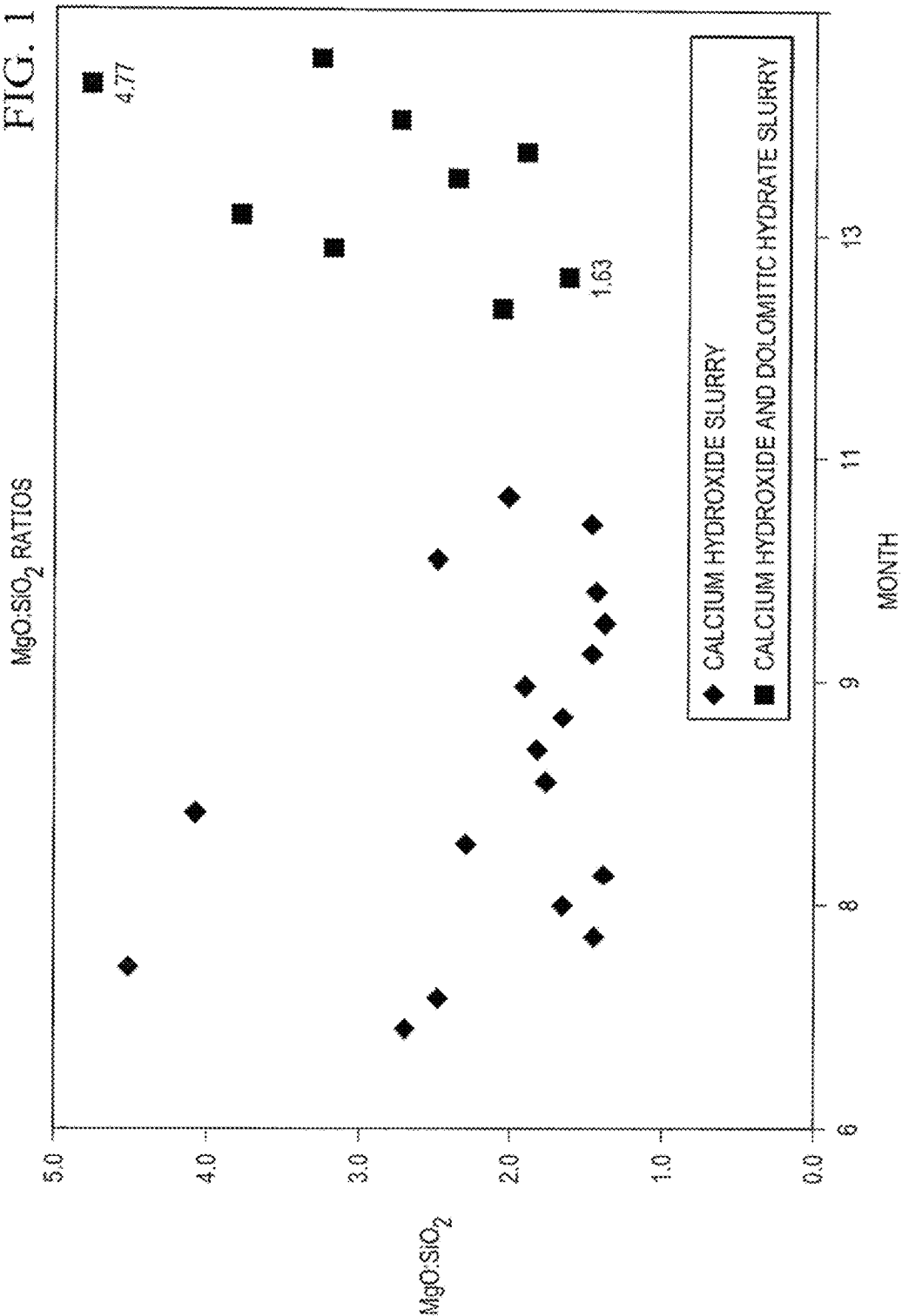

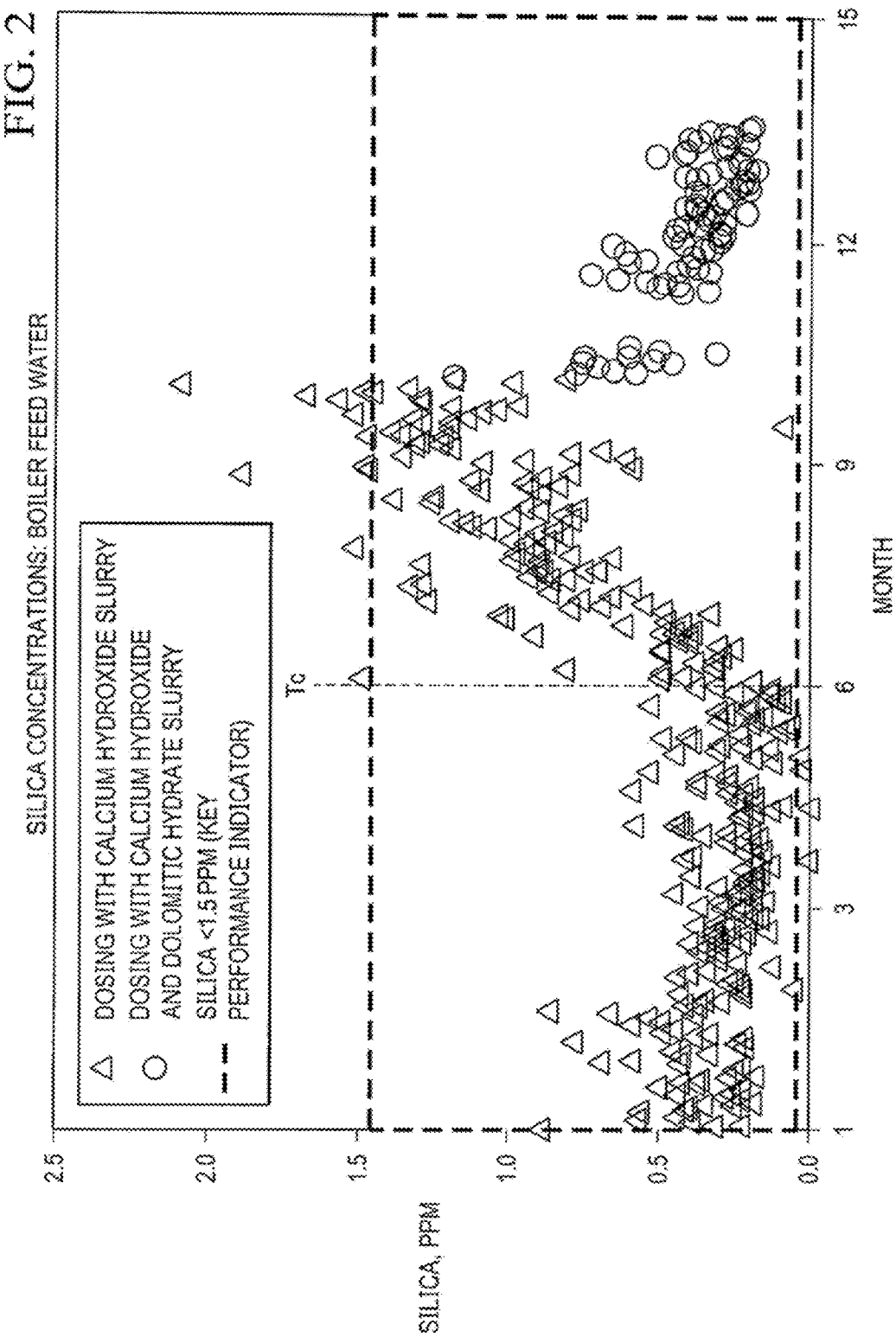

COMPOSITION AND METHOD FOR SIMULTANEOUS WATER SOFTENING AND SILICA REMOVAL IN BOILER FEED WATER

BACKGROUND OF THE INVENTION

1. Field of the Invention

The present invention relates generally to high performance, stable slurries comprised of Ca and Mg sourced from calcined lime and notably dolomite and particularly in the use of such slurries for water softening and silica removal in water treatment such as boiler feed water.

2. Description of the Prior Art

Impurities in boiler feed water con cause severe operational problems. Careful consideration must be given to the quality of the water used for generating steam. Boiler feed water composition should not exceed the tolerance limits of the particular boiler design (function of pressure, heat transfer rate, etc.). If the feed water docs not meet these requirements, it must be treated to remove impurities. Common feed water contaminants that can form boiler scale include calcium, magnesium, and silica. To prevent precipitation of calcium and magnesium salts in boiler feed water systems and in low-pressure boilers, softening by lime with or without soda ash is commonly employed as a first treatment step. This may be coupled with ion exchange and reverse osmosis (RO) if ultrapure water is required in e.g., high pressure boiler systems.

Silica scale formation on internal surfaces of heat-exchanging equipment is a serious threat to high pressure steam systems. Silica combines with many elements to produce silicates. Silicates form tenacious deposits in boiler tubing that have insulating properties and can cause tube failures. Typical polyphosphate and phosphonate antiscalants are ineffective against silica deposition. Silica deposits can often only be removed by fluoridic acids resulting in chemical and handling costs, system downtime and hazardous waste generation. This is a particular concern in thermoelectric generating plants as demand for reducing water footprint has prompted a shift from once-through to recirculating systems with the consequence of rapid concentration of contaminants. In addition, silica can vaporize into the steam at operating pressures as low as 30 bars and carried over to turbines where precipitation on the blades can result in reduced efficiency and an imbalance of the turbine wheels. Although nanofiltration (NF) and reverse osmosis (RO) are proven technologies for dissolved solids removal, they remain susceptible to silica fouling. Therefore, if silica enters boiler feed water, the usual corrective action is to increase boiler blowdown for reduction of silica concentration to acceptable levels followed by correcting the cause of contamination.

A common procedure for $SiO_2$ removal from boiler feed water is based on softening with lime [$Ca(OH)_2$] with or without soda ash [$Na_2CO_3$]. Lime softening utilizes the addition of calcium hydroxide to remove calcium and magnesium ions by precipitation. Silica is removed by co-precipitation in calcium and magnesium hydroxide floes. The precipitates can be sent to a clarifier or filter where the separated silica can be disposed.

It has been known for many years that silica removal during soda-lime softening can be enhanced in the presence of dissolved magnesium through chemical interactions. Silica is adsorbed onto magnesium hydroxide and precipitated at an elevated pH. However, naturally occurring magnesium content in raw waters is variable and often insufficient, therefore, additional dosing of magnesium compounds is required. The addition of soluble magnesium salts (e.g., $MgSO_4$, $MgCl_2$) is often not desirable due to an increase of total dissolved solids. Therefore MgO or $Mg(OH)_2$ can be used. Temperature and pH have important effects on silica removal by precipitation. The precipitation mechanism occurs faster and more completely at high temperatures (greater than 55° C.). The pH must be high enough to cause magnesium to precipitate hut not so high as to make the precipitant resoluble. Furthermore, for a chemical system to be considered as efficient for scale control, the following requirements must be met;

Minimum number and volume of chemical agents to be inventoried and handled, and preferably a single storage stable product;
Rapid process to match intake of make-up water;
Production of easily settleable or filterable flocs;
Able to be installed in-line with a small spatial footprint and energy demand;
pH compatible with other components and processes or discharge regulations.

The object of the present invention is to provide a single product for simultaneous control of hardness and silica in boiler feed water meeting the abovementioned requirements.

SUMMARY OF THE INVENTION

The invention allows achievement of water treatment targets using one single product that has a stable and pumpable viscosity over a period of one month of storage. It contains magnesium hydroxide, or at least a precursor of it as magnesium oxide, which targets silica removal, and calcium hydroxide, which rapidly increases pH and promotes water softening. The invention thus improves technical performance, eliminates handling of multiple products, and reduces overall treatment costs.

In addition, the slurry product of the invention provides odor control, as the readily available calcium hydroxide quickly neutralizes the source and the magnesium hydroxide provides continuous treatment. Lastly, the product is a source of alkalinity, as both the calcium and magnesium source provides alkalinity for water treatment.

The product under the form of a slurry of the invention is particularly useful in removing silica from water such as boiler feed water used in industrial processes. The slurry product of the invention is made up of hydrated lime particles and particles of at least partially hydrated dolime particles or magnesium hydroxide particles or magnesium oxide particles or a combination thereof. By the term "at least partially hydrated dolime" is meant a partially hydrated dolime or a fully hydrated dolime. By the term "partially hydrated dolime" is meant a calcium magnesium compound comprising calcium in majority or totally under the hydrated form $Ca(OH)_2$ and magnesium under the form MgO and optionally under hydrated form $Mg(OH)_2$. By the term "fully hydrated dolime" is meant a calcium magnesium compound comprising calcium and magnesium under their hydrated form $Ca(OH)_2$ and $Mg(OH)_2$ respectively, the resulting form MgO being marginal. The resulting slurry has a solid content up to about 60%, greater or equal to 25%, preferably greater or equal to 30%, more preferably greater or equal to 40%, in particular lower than or equal to 60%, preferably less than about 50% by weight of the slurry.

In a preferred embodiment, the slurry also maintains a stable and pumpable viscosity of less than about 1,000 mPa·s (i.e. 1,000 cPs) measured with a Brooksfield viscometer, RV #3 spindle, 100 RPM even up to in excess of one month.

In the slurry product according to the invention, the percentage of calcium to magnesium expressed as a percentage of calcium hydroxide to magnesium hydroxide is preferably in a range from 66-99% $Ca(OH)_2$ to 1-44% $Mg(OH)_2$ by dry weight. In the slurry product according to the invention, the hydrated lime has an available lime content of at feast 80%, preferably at least 85%, more preferably at least 90% by weight of the hydrated lime measured according to the ASTM C25 or the EN 459-2:2010 standard. The preferred hydrated lime particles have a $d_{90}$ of 8 to 145 µm, more preferably 8 to 54 µm, most preferably 8 to 23 µm. The hydrated lime particles have a $d_{50}$ of 2 to 17 µm, more preferably 2 to 7 µm, most preferably 2 to 3.5 µm In the slurry product according to the invention, the at least partially hydrated dolime or magnesium hydroxide or magnesium oxide particles or the combination thereof has a $d_{90}$ comprised between 10 and 100 µm, in particular about 40 and 55 µm and a $d_{50}$ between 2 and 10 µm, in particular about 3 and 5 µm. Advantageously, the slurry product prepared according to the teaching of the invention has a viscosity below about 1000 mPa·s, preferably below about 600 mPa·s, more preferably below about 400 mPa·s.

The slurry product of the invention can optionally contain a conventional dispersant, such as a polycarboxylate, a polyacrylate and/or a polyphosphonate type dispersant in an amount comprised between about 0.5 and 5 wt %, in particular between 0.5% and 3%, more particularly between 0.5% and 2% of the hydrated lime. Other conventional type additives can also be present, such as, for example, an additive selected from among sugars, such as sucrose, or preferably sorbitol, and present in an amount of up to 2 wt %, and/or an additive selected from among anti-scaling agents up to 2 wt %, and/or other dispersants.

In the process for preparing a slurry product of the invention, (1) a hydrated lime is blended with (2) a dolime, at least partially hydrated, or magnesium hydroxide or magnesium oxide particles or a combination thereof, wherein at least one of hydrated lime or dolime, at least partially hydrated, or magnesium hydroxide or magnesium oxide particles or a combination thereof is under the form of an aqueous slurry and wherein the amounts of hydrated lime and at least one of the dolime, at least partially hydrated, or magnesium hydroxide or magnesium oxide particles or the combination thereof are provided in an amount to constitute as a solids content of the slurry, up to about 60% and greater or equal to 25% by weight of the slurry, preferably up to about 30%, more preferably greater or equal to 40% by weight of the slurry product, more preferably between 30 and 40% by weight of the slurry.

The preferred hydrated lime will have a BET specific surface area below about 25 m²/g, preferably below about 10 m²/g, in particular below or equal to 8 m²/g.

The present invention can be further described as hereinafter.

In a first aspect, the present invention is related to a slurry for removing silica from water, the slurry comprising:
  hydrated lime particles;
  magnesium containing particles, the magnesium containing particles being selected from among the group consisting of at least partially hydrated dolime particles, magnesium hydroxide particles and magnesium oxide particles or a combination thereof;
  a source of water to form a slurry;
and characterized in that
  the slurry has a solid content in the range from about 25% to about 60%, preferably up to about 50% by weight of the slurry product, more preferably between 30 and 40% by weight in the slurry. In a second embodiment of the invention, the slurry maintains a stable and pumpable viscosity of <1,000 mPa·s for up to one month or more.

In another embodiment of the slurry according to the invention, optionally in combination with the second embodiment mentioned above, the percentage of calcium to magnesium expressed as a percentage of calcium hydroxide to magnesium hydroxide in the combined slurry is in a range from 66-99% $Ca(OH)_2$ to 1-44% $Mg(OH)_2$ by dry weight.

In another embodiment of the slurry according to the invention, optionally in combination with the one or more of the embodiments mentioned above, the hydrated lime has an available lime content of at least 80% in weight of the hydrated lime measured according to the ASTM C25 or EN 459-2:2010.

In another embodiment of the slurry according to the invention, optionally in combination with the one or more of the embodiments mentioned above, the hydrated lime particles have a $d_{90}$ of 5 to 150 µm, preferably of 8 to 145 µm.

In another embodiment of the slurry according to the invention, optionally in combination with the one or more of the embodiments mentioned above, the hydrated lime particles have a $d_{50}$ of 2 to 20 µm, preferably of 2 to 17 µm.

In another embodiment of the slurry according to the invention, optionally in combination with the one or more of the embodiments mentioned above, the dolime, at least partially hydrated, or magnesium hydroxide or magnesium oxide particles or the combination thereof has a $d_{90}$ comprised between 10 and 100 µm, preferably between 40 and 55 µm.

In another embodiment of the slurry according to the invention, optionally in combination with the one or more of the embodiments mentioned above, the dolime, at least partially hydrated, or magnesium hydroxide or magnesium oxide particles or a combination thereof has a $d_{50}$ between 2 to 10 µm, preferably between 3 and 3.5 µm.

In another embodiment of the slurry according to the invention, optionally in combination with the one or more of the embodiments mentioned above, the slurry has a viscosity below about 1000 mPa·s.

In another embodiment of the slurry according to the invention, optionally in combination with the one or more of the embodiments mentioned above, the slurry further comprises a dispersant notably of polycarboxylate type in an amount comprised between 0.5 and 5 wt %, preferably up to 3 wt % based upon the total weight of the hydrated lime.

In another embodiment of the slurry according to the invention, optionally in combination with the one or more of the embodiments mentioned above, the slurry further comprises an additive selected from the group consisting of sugars present in an amount of up to 2 wt % in might of the hydrated lime, an anti-scaling agent up to 2 wt %, and/or an additional dispersant compound.

According to a second aspect, the present invention is related to a process for manufacturing a slurry useful for removing silica from water, the process comprising the steps of:
  blending, in an aqueous medium, (1) hydrated lime under the form of an aqueous slurry or of a powder with (2) at least partly hydrated dolime or magnesium hydroxide or magnesium oxide particles or a combination thereof, under the form of an aqueous slurry or of a powder, and wherein the amounts of dolime, or magnesium hydroxide or magnesium oxide particles or the combination thereof are provided such as the solid content of the slurry is up to 60% by weight of the slurry.

In a second embodiment of the process according to the invention, the at least partially hydrated dolime, or magnesium hydroxide or magnesium oxide particles or a combination thereof are provided in amounts such that the percentage of calcium hydroxide to magnesium hydroxide is in a range comprised from about 66-99% $Ca(OH)_2$ to 1-44% $Mg(OH)_2$ by dry weight.

In another embodiment of the process according to the invention, optionally in combination with the second embodiment of the process mentioned above, the hydrated lime has an available lime content of at least 80%, measured according to the standard ASTM C25 or EN 459-2:2010.

In another embodiment of the process according to the invention, optionally in combination with one or more of the embodiments of processes mentioned above, the said hydrated lime particles have a BET specific surface area below about 25 $m^2/g$, in particular below about 10 $m^2/g$.

In another embodiment of the process according to the invention, optionally in combination with one or more of the embodiments of processes mentioned above, the hydrated lime particles have a $d_{90}$ of 5 to 150 μm, preferably of 8 to 145 μm.

In another embodiment of the process according to the invention, optionally in combination with one or more of the embodiments of processes mentioned above, the hydrated lime particles have a $d_{50}$ of 2 to 20 μm, preferably of 2 to 17 μm.

In another embodiment of the process according to the invention, optionally in combination with one or more of the embodiments of processes mentioned above, the at least partly hydrated dolime, or magnesium hydroxide or magnesium oxide particles or a combination thereof has a $d_{90}$ comprised between 10 and 100 μm, preferably between 40 and 55 μm.

In another embodiment of the process according to the invention, optionally in combination with one or more of the embodiments of processes mentioned above, the at least partly hydrated dolime, or magnesium hydroxide or magnesium oxide particles or a combination thereof has a $d_{50}$ comprised between 2 to 10 μm, preferably between 3 and 3.5 μm.

In another embodiment of the process according to the invention, optionally in combination with one or more of the embodiments of processes mentioned above, the process includes a step of adding a dispersant notably of polycarboxylate type in an amount comprised between 0.5 and 5 wt % of the hydrated lime.

In another embodiment of the process according to the invention, optionally in combination with one or more of the embodiments of processes mentioned above, the process further comprises the step of adding an additive selected from the group consisting of sugars, such as sucrose, an anti-scaling agent and an additional dispersant compound added in an amount of up to 2 wt %.

Additional objects, features and advantages will be apparent in the written description which follows.

BRIEF DESCRIPTION OF THE DRAWINGS

FIG. 1 is a graph showing the $MgO:SiO_2$ ratio before and during a trial treatment of boiler feed water using the compositions of the invention.

FIG. 2 is a graph of silica concentrations in the boiler feed water as a function of time when using calcium hydroxide slurry for water treatment and when using a blended calcium and magnesium hydroxide slurry according to the principles of the invention. In the graph, tC indicates the time of change for water source/quality.

DETAILED DESCRIPTION OF THE INVENTION

The present invention provides a solution to the previously described problems of water treatment and, particularly, treatment of industrial boiler feed water. The compositions of the invention take the form of a slurry product containing calcium hydroxide and magnesium hydroxide, or at least a precursor of it as magnesium oxide and having a solids content of up to about 60 wt % (most preferably 30-40%). Calcined dolomite, magnesium hydroxide or magnesium oxide provides the $Mg(OH)_2$ source for the combined slurry. Calcined limestone provides the source of calcium hydroxide.

Calcium oxide, CaO, is often referred to as "quicklime", while calcium hydroxide, $Ca(OH)_2$, is referred to as "hydrated lime", both sometimes being informally referred to as "lime". Quicklime is usually in the form of lumps or pebbles but it can also be a powder. Dry hydrated lime is usually a powder. In the meaning of the present invention, "powder" means a solid substantially made of particles lower than 2 mm, in particular lower than 1 mm or even lower than 500 μm and notably greater than 0.1 μm, in particular 0.5 μm.

According to present industry practices, in order to further process these compounds and improve the ease with which they are handled, dry CaO or dry $Ca(OH)_2$ is often mixed with water to form an aqueous suspension, i.e., a slurry, sometimes called milk of lime. This fluid suspension of slaked lime, also referred to as hydrated lime (calcium hydroxide—$Ca(OH)_2$), can include impurities, in particular silica, and magnesium oxide to the extent of a few percent. Such a suspension is obtained either by slaking quicklime (calcium oxide—CaO) with a large excess of water, or by mixing hydrated lime with water.

The resulting aqueous suspensions are often characterized by the concentration of the mass of the solid matter (% solids), the chemical reactivity of the slurry, and the distribution of the sizes of the particles in suspension (controlling in part viscosity). These characteristics determine, in part, the properties of the slurry, mainly its viscosity and its reactivity.

The reactivity of an aqueous calcium magnesium suspension is determined by the dissolution rates of the particles. It may be measured by injecting a small amount of the suspension in a large volume of demineralized water. This measurement, based on the recording of the time-dependent change in the conductivity of the resulting liquid phase, was developed for monitoring reactivity of lime milks intended for softening of drinking waters (v. Van Eckeren et al. *Improved Milk-of-Lime For Softening of Drinking Water: the Answer to the Carry-Over Problem*, In Aqua, 1994, 43 (1), p. 1-10). More details on the procedure for measuring this reactivity of lime milks are available in § 6.11. Determination of solubility index by conductivity of the standard EN 12485: 2010. The reactivity of an aqueous calcium magnesium suspension is also determining for any neutralization or precipitation operation.

In the present discussion, the distribution of particle sizes will be understood to mean the distribution as measured by means of a laser granulometer and the distribution is characterized in terms of, for example, the $d_{90}$ interpolated value of the particle size distribution curve, the dimension $d_{90}$ corresponding to the dimension for which 90% of the particles are less than the said dimension.

As used in the discussion which follows, the following terms will be understood by those skilled in the relevant industries to have the following meanings:

Limestone (calcium carbonate—$CaCO_3$ with impurities) is present in large quantities in natural rock around the world.

Quicklime (calcium oxide—CaO with impurities) is an alkali and the result of the chemical transformation of limestone by heating it typically above 900° C., which requires energy (typically 3.2 GJ/tCaO). Given its rapid reaction with water, calcium oxide, also called burnt lime, is often referred to as quick lime.

Hydrated lime or Slaked lime [calcium (di-)hydroxide—$Ca(OH)_2$ with impurities] is a strong alkali formed when calcium oxide reacts with water. This reaction generates heat. Depending on the amount of water used, calcium hydroxide can either be a dry hydrate (dry powder), a paste (putty lime) or a liquid milk of lime also called lime slurry (dry suspension in water).

High Calcium Hydrate or Hydrated calcium lime or "hical"—hydrated lime containing mainly calcium hydroxide thus containing a low amount of magnesium compound as impurity, i.e. when expressing magnesium as MgO, having less than 5% MgO typically a MgO content lower than 3%, in particular lower than 2% in weight.

Dolomite (double carbonate of calcium and magnesium—$CaCO_2.MgCO_2$) is the result of a partial or full dolomitization of calcium carbonate.

Dolime or dolomitic lime (calcium & magnesium oxide—CaO.MgO) is the result of the chemical transformation of double carbonate of calcium and magnesium by heating it typically above 900° C., which requires energy (typically 2.935 GJ/t CaO.MgO). Like quicklime, dolime reacts with water. CaO's affinity for water is higher than that of MgO.

Hydrated dolime (calcium & magnesium (tetra-)hydroxide—$Ca(OH)_2.Mg(OH)_2$) represents the completion of the hydration reaction carried out in pressurized reactors at temperatures of around 150° C.

The lime slurries preferred for purposes of the present invention are fine milk of lime slurries with high solids content and relatively low viscosity so as to be easily pumpable. Those skilled in the relevant arts will appreciate that it is sometimes difficult to achieve the desired balance between viscosity, solids content and reactivity in the resulting lime slurries. Variables that generally affect the quality of slaked lime are disclosed in J. A. H. Oates—*"Lime and Limestone"* (pages 229-248) as well as in Boynton—*"Chemistry and Technology of Lime and Limestone"* (pages 328-337).

Some of the known commercial technologies for producing lime slurries having high solids contents include the following:

For example, it is known to increase the solids content of the milk of lime by adding a dispersing agent, in the presence of a small quantity of an alkaline metal hydroxide (U.S. Pat. Nos. 5,616,283, 4,849,128, and 4,610,801). This method of preparation makes it possible to achieve concentrations of dry matter greater than 40 wt % based on the total weight of the milk of lime, with a viscosity less than 1200 mPa·s.

It is also known to increase the solids content in the suspension, while limiting the increase in viscosity, by incorporating hydrated lime having a coarser particle size or by slaking quicklime tinder conditions favorable to the growth of the grains; for example, by limiting the increase in temperature during slaking and by adding additives such as sulfates etc. (U.S. Pat. No. 4,464,353).

One high solids content calcium hydroxide slurry useful for purposes of the present invention can be prepared according to the teachings of U.S. Pat. No. 8,206,680, issued Jun. 26, 2012, to Diaz Chavez, et al. and assigned to the assignee of the present invention. That reference describes a calcium magnesium aqueous suspension having particles of solid matter with (before being put into suspension) a specific surface area, calculated according to the BET nitrogen absorption method, which is less than or equal to 10 $m^2/g$. Such an aqueous suspension of calcium magnesium solid matter can achieve a very low viscosity, making it possible to greatly increase the solid matter concentration of the suspension, or again to reduce the size of the particles in suspension, thus obtaining a concentrated and reactive milk of lime.

In the discussion which follows, the term "BET" nitrogen absorption method will be understood to mean the determination of the specific surface area of the slaked lime as measured by nitrogen adsorption manometry and calculated according to the BET method, after degassing in vacuum at 190° C. for at least 2 hours.

Preferably, the particles of solid matter of the high solids content calcium hydroxide slurry have a specific surface area according to the BET method of less man or equal to 25 $m^2/g$, preferably less than or equal to 10 $m^2/g$. The suspensions thus prepared advantageously have a dynamic viscosity less than or equal to 1000 mPa·s, preferably less than or equal to 600 mPa·s. Under these conditions it is possible to obtain a suspension having solid matter contents greater than 25 wt %, and advantageously at or greater than 40 wt %, and/or $d_{98}$ granulometric dimensions of less than 20 microns, preferably equal to or less than 5 microns.

One "hical" lime slurry products that can be used for manufacturing the slurry product of the invention is a 45 wt % solids slurry, with a viscosity of less than 600 mPa·s and a particle size distribution with a $d_{50}$ value of 2.5-3.5 µm and $d_{98}$ value of less than 90 µm.

As mentioned, the slurry product of the invention has a source of calcium as one component and a source of magnesium as a second component. Particularly preferred sources of the calcium for the slurries of the invention are from calcium hydroxide such as a hical slurry, as described, or from products as described in the previously cited U.S. Pat. No. 8,206,680 B2. As also mentioned, the preferred calcium hydroxide slurries have an average particle size distribution $d_{90}$ of 8-145 µm; a $d_{50}$ of 2-17 µm; and an available lime as measured by the ASTM C25 or EN 459-2:2010 standard of greater than or equal to about 80%.

The slurry of the invention typically comprises up to 44 wt % $Mg(OH)_2$ as the second component of the slurry formulation. The $Mg(OH)_2$ can conveniently be sourced from dolomitic hydrate or magnesium hydroxide or magnesium oxide. One preferred source of magnesium for the magnesium hydroxide slurries can be from dolomitic hydrate which has an average particle size distribution $d_{90}$ of about 40-55 µm; a $d_{50}$ size distribution from about 3.0 to 5 microns. The source of magnesium can also be from any commercially available magnesium hydroxide or magnesium oxide.

The slurries of the invention can also contain other conventional additives, such as an optional dispersing agent. The dispersing agent can be one of those previously described, including the use of a conventional polycarboxylate or polyacrylate and/or polyphosphonate dispersant in an amount comprised between about 0.2 and 5.0 wt %, preferably between about 0.5 and 5 wt %, of the hydrated lime. Other conventional additives may also be present such as an additive selected from the group consisting of sugars, such as sucrose, or preferably sorbitol, and present in an amount of up to 2 wt %; and/or an additive selected from the group consisting of anti-scaling agents present up to about 2 wt %, and/or other dispersants, all weights being based upon the weight of hydrated lime used.

The water used to suspend the hydroxides can be used from multiple sources; however, softened water or low hardness tap water (total hardness of <100 ppm) is preferred to maintain the product's reactivity and effectiveness.

The manufacturing process of the slurry product is created by blending in an aqueous medium a hydrated lime product with an at least partially hydrated dolime product or magnesium oxide or magnesium hydroxide or a combination thereof in predetermined ratios (optionally with a dispersant or other additive of the type described) and wherein
the hydrated lime product is under the form of a slurry or a powder and
the at least partially hydrated dolime product or magnesium oxide or magnesium hydroxide or a combination thereof is under the form of a slurry or a powder.

In an embodiment of the process of the invention, a hical (standard hydrate at 1-2% moisture) calcium hydroxide slurry or a slurry according to U.S. Pat. No. 8,206,680 B2 is blended with a dolomitic hydrate (fully hydrated dolime) or magnesium hydroxide slurry.

In another embodiment of the process of the invention, a hical calcium hydroxide under the form of powder is blended with a dolomitic hydroxide or magnesium hydroxide under the form of a powder in presence of water.

In another embodiment of the process of the invention, a hical calcium hydroxide slurry or an aqueous suspension as described in U.S. Pat. No. 8,206,680B2 is blended with a dolomitic hydroxide or magnesium hydroxide under the form of powder.

In another embodiment of the invention, a hical calcium hydroxide under the form of a powder is blended with a dolomitic hydroxide slurry or magnesium hydroxide slurry.

The ratio of $Ca(OH)_2$ to $Mg(OH)_2$ employed in the slurries of the invention varies depending upon raw water chemistry. For example, a low silica concentration removal (20 ppm) was found to be effective using a dry ratio of approximately 9:2 calcium hydroxide to dolomitic hydrate [92% $Ca(OH)_2$ to 8.0% $Mg(OH)_2$] or high silica concentration removal (100 ppm) a dry ratio of approximately 3:10 calcium hydroxide to dolomitic hydrate [66.2% $Ca(OH)_2$ to 33.8% $Mg(OH)_2$] was found to be effective.

The slurries of the invention are also characterized as having a stable viscosity over 30 days of <1,000 mPa·s measured using a Brooksfield viscometer with an RV #3 spindle at 100 RPM, thereby remaining pumpable. The slurries are easily resuspendable without hard packing.

Example of the Practice of the Invention:

An oil refinery was using lime softening for boiler feed water preparation from a blend of ground water and municipal tap water. The average quality composition of the feed water is 175 $mg/dm^3$ total hardness and 13.5 $mg/dm^3$ $SiO_2$. Target concentrations for hardness and silica after lime softening are <50 $mg/dm^3$ and <1.5 $mg/dm^3$, respectively. The water quality composition fluctuates in terms of total hardness and ratio $MgO:SiO_2$ (1:1 to 5:1). For the lower ratio of 1:1 to 3:1, silica levels in the boiler feed water increased from <0.5 $mg/dm^3$ to 2.1 $mg/dm^3$, exceeding the target concentration of <1.5 $mg/dm^3$. This was attributed to two factors: (1) the low $MgO:SiO_2$ ratio (1:1 to 3:1) in the raw water is insufficient to remove silica through precipitation of a magnesium hydroxide silicate compound, and (2) the lower total hardness of the raw water (120 $mg/dm^3$) results in reduced co-precipitation of silica. The $MgO:SiO_2$ ratio needed at this site, taking into account the incoming and target silica concentrations, was calculated at ≥3:1.

The solution proposed for this plant was to change the dosing reagent from a solely calcium-based product to the slurry product of the invention with a solid content typically greater than 40 wt %. The blend was optimized based on operating parameters and treatment targets for softening and silica removal at this refinery. A $Ca(OH)_2$ to $Mg(OH)_2$ ratio of 92:8 was engineered to provide sufficient magnesium content for removal of silica to the required <1.5 $mg/dm^3$ in the boiler feed water while providing simultaneous softening. Silica concentrations in the boiler feed water immediately and significantly decreased. A reduction from 2.1 $mg/dm^3$ silica to less than 0.6 $mg/dm^3$ silica was measured after two days from the start of dosing of the new composition. Silica continued to decrease as the slurry took full effect in the system and the boiler feed water returned consistent silica concentrations of 0.2 to 0.5 $mg/dm^3$ in the months that followed. In addition, the ratio of hydroxide consumed per hardness removed decreased by 11%, indicating further optimization of the softening process with the new composition.

FIG. 1 of the drawings is a graph showing the $MgO:SiO_2$ ratio before and during a trial treatment of boiler feed water using the compositions of the invention. The data on the left of the graph represents the historical data and the data on the right of the graph represents the data taken during the trial. The required ratio of $MgO:SiO_2$ is typically optimized between about 1-5.

FIG. 2 of the drawings is a graph of silica concentrations in the boiler feed water in function of the time when using calcium hydroxide slurry for water treatment and when using a blended calcium and magnesium hydroxide slurry according to the principles of the invention. It will be observed that the source of water changed after at a certain time (Tc), thus necessitating a change in the water treatment protocol at the plant. The triangle data points represent a slurry of calcium hydroxide alone. The circle data points represent a treatment with a slurry of the invention containing a combined calcium hydroxide slurry and magnesium hydroxide.

In summary, after the raw water change it was found that supplemental magnesium was necessary to reach the silica concentration targets in the boiler feed water. Once switching to the new composition of the invention as described herein, the silica targets were easily met due to the fine particle size ($d_{50}$≤2.5 µm) and high reactivity of the engineered calcium hydroxide slurry paired with the fine dolomitic hydrate. This stable viscosity engineered slurry promoted quick and efficient hardness removal and silica precipitation. The refinery was able to avoid any additional treatment/chemicals and their associated equipment costs to achieve the necessary final water quality. The solution is flexible and the chemistry of the composition with both calcium and magnesium can easily be tailored to address any future raw water changes.

An invention has been provided with several advantages. The combined slurry product of the invention provides a single product for simultaneous control of hardness and silica in boiler feed water meeting the abovementioned requirements as well as offering the following additional advantages:

- Minimum number and volume of chemical agents to be inventoried and handled, and preferably a single storage stable product;
- Rapid process to match intake of make-up water;
- Production of easily settleable or filterable flocs;
- Able to be installed in-line with a small spatial footprint and energy demand;
- pH compatible with other components and processes or discharge regulation.

The invention allows achievement of water treatment targets using one single product that has a stable and pumpable viscosity over greater than a one month period of storage; it contains magnesium hydroxide, which targets silica removal, and calcium hydroxide, which rapidly increases pH and promotes water softening. The amount of magnesium in the ultimate slurry blends of the invention is sufficient to encompass fluctuations of naturally occurring silica and magnesium components in the raw water. The invention thus improves technical performance, eliminates handling of multiple products, and reduces overall treatment costs. In addition, this combined product provides odor control, as the readily available calcium hydroxide quickly neutralizes the source and the magnesium hydroxide provides continuous treatment. Lastly, the product is a source of alkalinity, as both the calcium and magnesium source provides alkalinity for water treatment.

While the invention has been shown in several of its forms, it is not thus limited but is susceptible to various changes and modifications without departing from the spirit thereof.

What is claimed is:

1. A single slurry product for removing silica from boiler feed water while simultaneously softening the water, the single slurry product comprising:
    a combination through simple mixing of a hi-cal, calcium hydrate aqueous slurry which has a desired low viscosity, a desired viscostability and high reactivity with a fully hydrated dolomitic hydrate to thereby form a single slurry product, where the single slurry product inherits these desired characteristics of the hi-cal, calcium hydrate aqueous slurry and can be applied to the dual task of water softening and silica removal;
    wherein the fully hydrated dolomitic hydrate has a particle size range, $d_{90}$, of 40-55 µm and a $d_{50}$ of 3.0 to 5 µm;
    wherein the single slurry product is further characterized as having a solid content in the range from about 25% to about 60% by weight in the slurry;
    wherein the percentage of calcium to magnesium expressed as a percentage of calcium hydroxide to magnesium hydroxide in the single slurry product is in a range from 66-99% $Ca(OH)_2$ to 1-44% $Mg(OH)_2$ by dry weight;
    wherein the hi-cal, calcium hydrate aqueous slurry is made up, in part, of hydrated lime particles, and wherein the hydrated lime particles have an available lime content of at least 80% in weight of the hydrated lime particles measured according to the ASTM C25 or EN 459-2:2010;
    wherein the hydrated lime particles have a specific surface area according to the BET method, after degassing in vacuum at 190° C. for at least 2 hours of less than or equal to 10 $m^2/g$;
    wherein the hydrated lime particles have a $d_{90}$ of 8 to 54 µm and a $d_{50}$ of 2 to 3.5 µm; and
    wherein the boiler feed water has a measurable total hardness and a measurable silica content, and wherein the single slurry product is effective to lower the measurable total hardness of the feed water below 50 $mg/dm^3$ and to reduce the measurable silica content below 1.5 $mg/dm^3$, respectively, while maintaining a stable and pumpable viscosity of <1,000 mPa·s for at least one month as measured using a Brookfield viscometer with an RV #3 spindle at 100 RPM.

2. The slurry of claim 1, further comprising a polycarboxylate dispersant in an amount comprised between 0.5 and 5 wt %, based upon the total weight of the hydrated lime particles.

3. The slurry of claim 2, further comprising an additive selected from the group consisting of sugars, an anti-scaling agent and/or an additional dispersant compound, present in an amount of up to 2 wt % in weight of the hydrated lime particles.

4. A single slurry product for removing silica from boiler feed water while simultaneously softening the water, the single slurry product comprising:
    a combination through simple mixing of a hi-cal, calcium hydrate aqueous slurry with a fully hydrated dolomitic hydrate where the single slurry product can be applied to a dual task of water softening and silica removal;
    wherein the single slurry product is further characterized as having a solid content in the range from about 25% to about 60% by weight in the single slurry product;
    wherein the percentage of calcium to magnesium expressed as a percentage of calcium hydroxide to magnesium hydroxide in the the slurry product is in a range from 66-99% $Ca(OH)_2$ to 1-44% $Mg(OH)_2$ by dry weight;
    wherein the hi-cal, calcium hydrate aqueous slurry is made up of hydrated lime particles which have an available lime content of at least 80% in weight of the hydrated lime particles measured according to the ASTM C25 or EN 459-2:2010;
    wherein the hydrated lime particles have a specific surface area according to the BET method, after degassing in vacuum at 190° C. for at least 2 hours of less than or equal to 10 $m^2/g$;
    wherein the hydrated lime particles have a $d_{90}$ of 8 to 54 µm and a $d_{50}$ of 2 to 3.5 µm; and
    wherein the boiler feed water has a measurable total hardness and a measurable silica content, and wherein the single slurry product is effective to lower the measurable total hardness of the feed water below 50 $mg/dm^3$ and to reduce the measurable silica content below 1.5 $mg/dm^3$, respectively, while maintaining a stable and pumpable viscosity of <1,000 mPa·s for at least one month as measured using a Brookfield viscometer with an RV #3 spindle at 100 RPM.

5. A process for manufacturing the single slurry product of claim 1 for removing silica from boiler feed water while simultaneously softening the boiler feed water, the process comprising a step of blending the hi-cal, calcium hydrate aqueous slurry with the fully hydrated dolomitic hydrate.

6. The process of claim 5, including a step of adding a polycarboxylate dispersant in an amount comprised between 0.5 and 5 wt % of the hydrated lime.

7. The process of claim 6, further comprising a step of adding an additive selected from the group consisting of sugars, an anti-scaling agent and an additional dispersant compound added in an amount of up to 2 wt % in weight of the hydrated lime.

* * * * *